US010756948B1

(12) United States Patent
Waugh et al.

(10) Patent No.: US 10,756,948 B1
(45) Date of Patent: Aug. 25, 2020

(54) HORIZONTAL SCALING OF TIME SERIES DATA

(71) Applicant: Amazon Technologies, Inc., Seattle, WA (US)

(72) Inventors: Robert Mark Waugh, Seattle, WA (US); Emmanuel Pierre Devillard, Issaquah, WA (US); Daniel Vassallo, Seattle, WA (US); Nitin Kesarwani, Seattle, WA (US); Greg Sterin, Seattle, WA (US); Hongqi Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 556 days.

(21) Appl. No.: 14/830,575

(22) Filed: Aug. 19, 2015

(51) Int. Cl.
*G06F 15/16* (2006.01)
*H04L 12/24* (2006.01)
*H04L 29/08* (2006.01)

(52) U.S. Cl.
CPC ........ *H04L 41/0622* (2013.01); *H04L 41/024* (2013.01); *H04L 67/1021* (2013.01)

(58) Field of Classification Search
CPC ............... H04L 41/0622; H04L 41/024; H04L 41/1021
USPC ........................................................ 709/226
See application file for complete search history.

(56) References Cited

U.S. PATENT DOCUMENTS

2016/0078654 A1* 3/2016 Schlossnagle ....... G06K 9/4642
345/440.2
2016/0371363 A1* 12/2016 Muro ....................... G01D 9/28

* cited by examiner

*Primary Examiner* — Normin Abedin
(74) *Attorney, Agent, or Firm* — Davis Wright Termaine LLP

(57) ABSTRACT

A leader host obtains individual distributions of data sets ingested by individual hosts of a fleet of hosts over a domain. The leader host compiles the individual distributions over the domain to generate a compiled distribution. The leader host then partitions the domain based at least in part on the generated compiled distribution. These partitions of the partitioned domain are distributed to individual hosts of the fleet of hosts, which causes the individual hosts to process a portion of the distributed date set according to their respective partitions.

20 Claims, 8 Drawing Sheets

HORIZONTAL SCALING OF TIME SERIES DATA

BACKGROUND

In a distributed network system environment, various physical hosts receive data from a variety of different data sources over time. This data may be received out of order across a horizontally scaled ingestion fleet of physical devices, such that the data has to be sorted and merged in order to support customer requests for this data. For instance, the horizontally scaled ingestion fleet of physical devices often collocate the obtained data to a vertically scaled physical host, which can perform the sort and merging of data to support customer requests for the data. However, sorting this data across the horizontally scaled ingestion fleet of physical devices can be difficult, particularly when the data is arriving out of order across the fleet.

BRIEF DESCRIPTION OF THE DRAWINGS

Various embodiments in accordance with the present disclosure will be described with reference to the drawings, in which.

DETAILED DESCRIPTION

Figure 1:
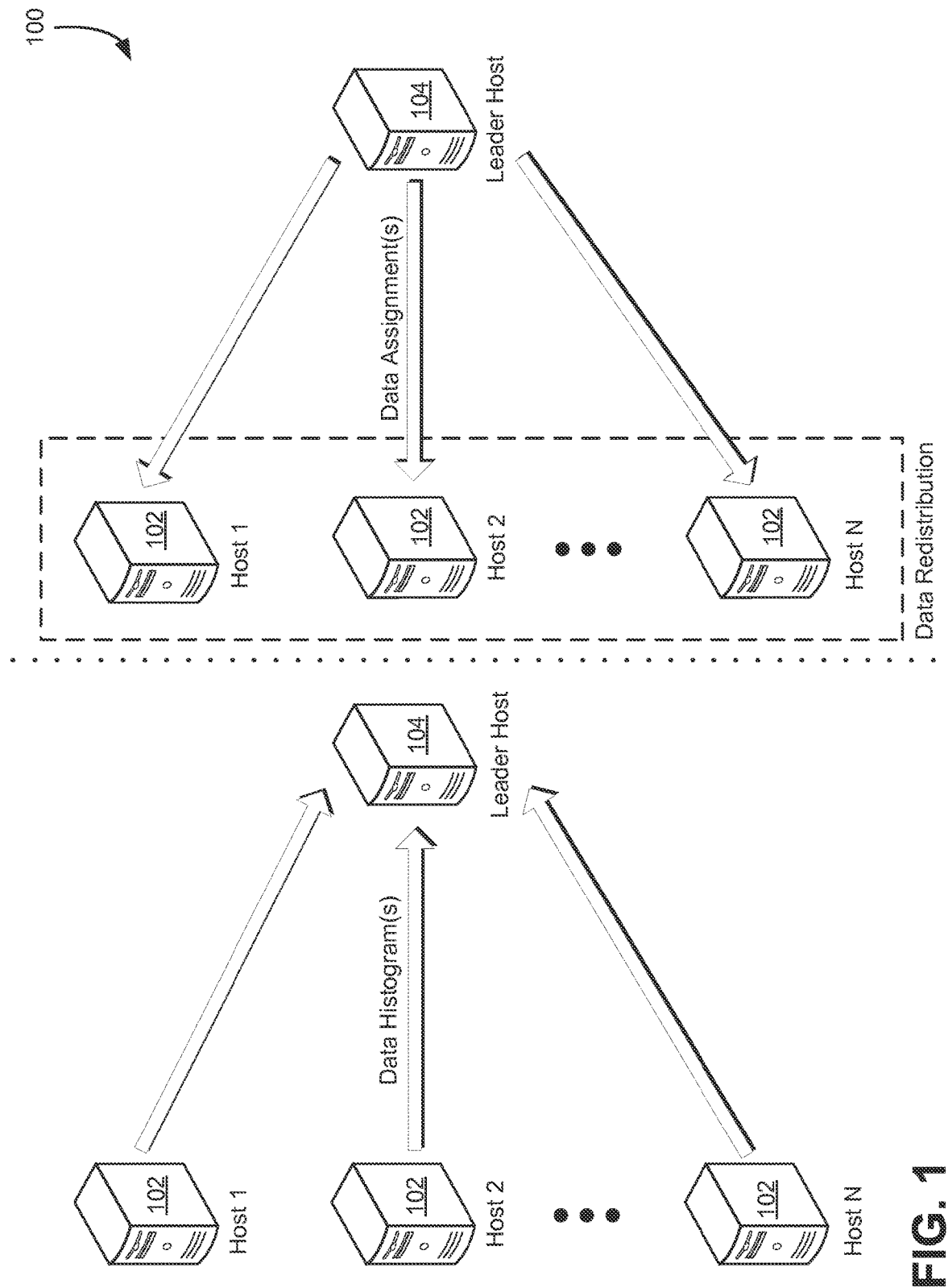
FIG. 1 shows an illustrative example of an environment in which various embodiments can be implemented.

This disclosure relates to the use of horizontally scaled physical hosts to perform a horizontally partitioned sort of data obtained by the physical hosts without need for a vertically scaled physical host for collocation of the data obtained by the physical hosts. When a physical host (e.g., computing device within a distributed network) receives data from a variety of data sources, the physical host may evaluate the time stamps for the received data and generate a data histogram for the received data over a duration of a particular time interval. For instance, the physical host may be configured to generate a data histogram for time sub-intervals of the particular time interval as defined by an administrator of the distributed network or other entity. The data histogram may be used to demonstrate the amount of data received over the duration of the particular time interval. Once the physical host has completed generating the data histogram for data received over the duration of the particular time interval, the physical host may transmit the data histogram to a leader physical host that may be configured to compile the data histograms from various physical hosts of the distributed network.

When the leader physical host obtains the data histograms from the various physical hosts in the distributed network, the leader physical host may merge these histograms together to generate the compiled histogram for the time interval. The leader physical host may keep track of the data contribution by each physical host through the duration of the time interval in order to determine how to apportion the time series data points to each physical host. For instance, the leader physical host may divide the compiled histogram into a number of segments equal to the number of physical hosts that have provided their respective histograms to the leader physical host. Further, the leader physical host may perform this division of the compiled histogram in a manner that weighs each segment by the size of the observation payload. For example, the leader physical host may attempt to divide the segments in a manner such that each segment has the same or close to the same amount of data for each physical host.

Once the leader physical host has divided the compiled data histogram into a number of segments for each physical host, the leader physical host may assign a segment to each physical host based on the physical host that has contributed the most data for the particular segment, with a limit of one segment per physical host. The leader physical host may transmit these assignments to the physical hosts to enable the physical hosts to obtain the data included in its assignment and provide any other data to the other physical hosts to which the data has been assigned. When the physical hosts obtain their respective assignments from the leader physical host, the physical hosts may connect to one another within the distributed network. Each physical host may then transmit data for time observations outside of their designated time sub-interval for the time interval to the corresponding physical host that has been assigned to the time sub-interval for these time observations. In a similar fashion, each physical host may also receive data for time observations within their designated time sub-interval for the time interval. Once a physical host has obtained all of the data for its assigned time sub-interval, the physical host may sort this obtained data and any data not transmitted to other physical hosts for further use in supporting customer requests for data.

When a customer submits a request to download data for a particular time interval, a service of the distributed network may identify the physical hosts that have stored the required data to fulfill the request. For instance, the service may maintain a database or other data store that may specify which physical hosts have data corresponding to various time sub-intervals within the distributed network. Based on this information, the service may transmit a request to the identified physical hosts to obtain the required data to fulfill the customer's request and provide this data to the customer.

In this manner, the distributed network may utilize a horizontally scaled fleet of physical hosts to sort time-partitioned data without need for a vertically scaled physical host for collocation of the data. In other words, data may be distributed and sorted among a fleet of physical hosts with minimal exchange of data among the physical hosts of the fleet. In addition, using a horizontally scaled fleet of physical hosts to sort this time-partitioned data may provide additional technical advantages. For instance, because each physical host is configured to transmit time series data points for a particular time sub-interval to another physical host that has been assigned to that time sub-interval, the horizontally partitioned sort of data may be performed with a minimal exchange of data of no greater magnitude than the ingestion or egress cost of the data. Further, since the horizontally scaled fleet of physical hosts no longer have to rely on a single physical host for collocation of the data, there is reduced risk of data loss since no one physical host will have the entire set of data for a particular time interval.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 shows an illustrative example of an environment 100 in which various embodiments can be implemented. In the environment 100, one or more physical hosts 102 may be configured to receive data from a variety of sources. The one or more physical hosts 102 may include one or more computer devices that may comprise at least one processor, one or more storage devices, memory (e.g., random-access memory (RAM)), network devices (e.g., modems, routers, etc.), and other components that may be used by the physical host 102 within a distributed network. When a physical host 102 receives data from one or more data sources (e.g., customers, services operated using computing devices in the distributed network, external services, etc.), the physical host 102 may store the received data within one or more storage devices of the physical host 102. As the data is received, if it is determined that the physical host 102 is not capable of storing the data, such as in the event of a data overflow, an administrator or automated process of the distributed network may provision additional physical hosts 102 to receive this data and store the data within their own storage devices. Thus, in some embodiments, the physical hosts 102 are part of a horizontally scaled data ingestion fleet (e.g., as necessary, the fleet may add additional physical hosts to the fleet), whereby the fleet is horizontally scaled based at least in part on the amount of data received at any given time from a variety of data sources.

In an embodiment, each physical host 102 of the horizontally scaled data ingestion fleet generates a data histogram of the times observed within its local dataset. The physical host 102 may record the timestamp for received data points (e.g., elements, observations, etc.) over a duration of a particular time interval. For instance, a data point within the histogram may correspond to the time at which data was received and the size of the data received at this time. For example, if a data histogram is generated to specify data received by the physical host 102 for a particular time interval, the physical host 102 may evaluate all data received for the duration of the time interval and utilize the size of each data element and the timestamp for each data element to construct the data histogram such that the data histogram may illustrate, for that physical host 102, a representation of data received during the time interval. The size of each data element may be represented in increments of bytes (e.g., kilobytes, megabytes, gigabytes, etc.).

Once each physical host 102 of the horizontally scaled data ingestion fleet has completed generation of their respective data histograms, the physical hosts 102 may select a leader physical host 104 that may be used to compile the various data histograms generated by the physical hosts 102. The leader physical host 104 may be selected based at least in part on certain criteria. For instance, the leader physical host 104 may be selected from a pool of physical hosts that may be independent from the one or more physical hosts 102 of the horizontally scaled data ingestion fleet (e.g., a physical host that has not obtained data during the time interval). Alternatively, the leader physical host 104 may be selected from among the one or more physical hosts 102 of the horizontally scaled data ingestion fleet. For instance, the physical hosts 102 may select a physical host that has sufficient storage capacity for the various data histograms from the other physical hosts 102 of the horizontally scaled data ingestion fleet. Further, the selected physical host may be required to have sufficient computational capability (e.g., processor capabilities, RAM availability, etc.) to compile the various data histograms and perform operations on the compiled data histogram for determining a redistribution scheme for the time series data points stored among the various physical hosts 102 of the horizontally scaled data ingestion fleet.

When a leader physical host 104 is selected by the one or more physical hosts 102 of the horizontally scaled data ingestion fleet, each of the one or more physical hosts 102 may transmit its corresponding data histogram to the leader physical host 104 for processing. Once the leader physical host 104 obtains the data histograms from the one or more physical hosts 102 of the horizontally scaled data ingestion fleet, the leader physical host 104 may merge the received data histograms to generate a compiled data histogram that specifies the data ingested by the one or more physical hosts 102 throughout the duration of the time interval. In an embodiment, the leader physical host 104 merges the data histograms in a manner that tracks the relative contribution of each physical host 102 to the various data points within the compiled data histogram. For instance, if a number of physical hosts 102 have obtained data over a particular time sub-interval of the time interval, the compiled data histogram, for that particular time sub-interval, may illustrate the contribution of each physical host 102 to the data point represented within the compiled data histogram for that time sub-interval.

In an embodiment, the leader physical host 104 will divide the compiled data histogram into a number of segments weighted by the size of the observation payload (e.g., similar amount of bytes per segment, regardless of the time interval spanned per segment). The number of segments may be determined based at least in part on the number of physical hosts 102 that have provided data histograms for the time interval. For instance, the leader physical host 104 may divide the compiled data histogram into a number of segments equal to the number of physical hosts 102 of the horizontally scaled data ingestion fleet that have provided data histograms for the time interval. As an illustrative example, if the compiled data histogram covers a time interval of ten minutes, and the compiled data histograms represents a gigabyte of data ingested by five distinct physical hosts 102, the leader physical host 104 may divide the compiled data histogram into five distinct segments whereby each distinct segment may correspond to approximately 200 megabytes of data (e.g., one gigabyte divided among five distinct physical hosts 102). As data ingestion during the time interval may differ based at least in part on the volume of data ingested, each segment may span different time periods (e.g., intervals), such that a segment may span a longer time period than other segments of the compiled data histogram.

Once the leader physical host 104 has divided the compiled data histogram into a number of distinct segments, the leader physical host 104 may assign a segment to each physical host 102 of the horizontally scaled data ingestion fleet. In an embodiment, the leader physical host 104 evaluates the contribution by each physical host 102 to a particular segment to determine which physical host 102 will be assigned this particular segment. For instance, the leader physical host 104 may determine which physical host 102 has stored the most data for the segment such that the leader physical host 104 may assign the segment to the physical host 102 that has stored within it the most data for the segment or, in other words, the highest relative contribution to the total data points observed over the time interval of the segment. Note that, in some circumstances, two or more hosts may have equal contributions to the segment and, therefore, may all have highest relative contributions to the total data points in the segments. In such circumstances, a host with a highest relative contribution may be randomly or otherwise selected. In some instances, if the same physical host 102 has contributed the most data for more than one segment, the leader physical host 104 may assign the segment representing the greatest amount data stored within the physical host 102 to the physical host 102. The other segment may be assigned to a physical host 102 that has a second greatest amount of data stored within it for the segment. Thus, each physical host 102 may be assigned a single segment of the compiled data histogram.

When the physical hosts 102 of the horizontally scaled data ingestion fleet obtain their respective assignments from the leader physical host 104, the physical hosts 102 may connect to one another to transfer data among the physical hosts 102 according to the assignments. For instance, a physical host 102 may transmit data from its storage devices to the assigned physical host 102 corresponding to the time interval for the data. Similarly, the physical host 102 may receive, from the other physical hosts of the horizontally scaled data ingestion fleet, data corresponding to the time interval assigned to the physical host 102 by the leader physical host 104. This may result in a number of network data exchanges having asymptotic behavior of:

$$O\left(\left(1-\frac{1}{N}\right)M\right)$$

where N is the number of physical hosts 102 of the horizontally scaled data ingestion fleet and M is the total amount (measured in bytes) of data ingested by the horizontally scaled data ingestion fleet that is to be sorted. The symbol "O" or "Big O notation" is used to symbolically express the asymptotic behavior of a function, such as a function describing the number of network data exchanges (e.g., either describing exactly or approximately). For example, a function f is said to be $O(g(x))$ if there are positive numbers K and $x_0$ such that $|f(x)| \leq K|g(x)|$ for all x greater than $x_0$. Similarly, each physical host 102 of the horizontally scaled data ingestion fleet may be expected to perform a number of data exchanges having asymptotic behavior of:

$$O\left(\left(1-\frac{1}{N}\right)\frac{M}{N}\right)$$

where N is the number of physical hosts 102 of the horizontally scaled data ingestion fleet and M is the total amount of data to be sorted.

Once the exchange of data has been performed among the various physical hosts 102 of the horizontally scaled data ingestion fleet, each physical host 102 may sort its stored data based at least in part on the timestamps of the data received and any data not transferred to other physical hosts 102. This may result in the data stored within the physical hosts 102 of the horizontally scaled data ingestion fleet having a global ordering due to the prior partitioning of the time series data points according to the time intervals as specified by the leader physical host 104. In an embodiment, an administrator of the distributed network or other computer system used to support one or more services of the distributed network will update a database or other datastore to indicate, for the time interval, where the data for particular time intervals is stored. Thus, if a customer submits a request to retrieve data for a particular time interval, the computer system may utilize the database or other datastore to identify the one or more physical hosts 102 that have the data for the specified time interval and transmit executable instructions to these one or more physical hosts 102 to obtain the requested data.

Figure 2:
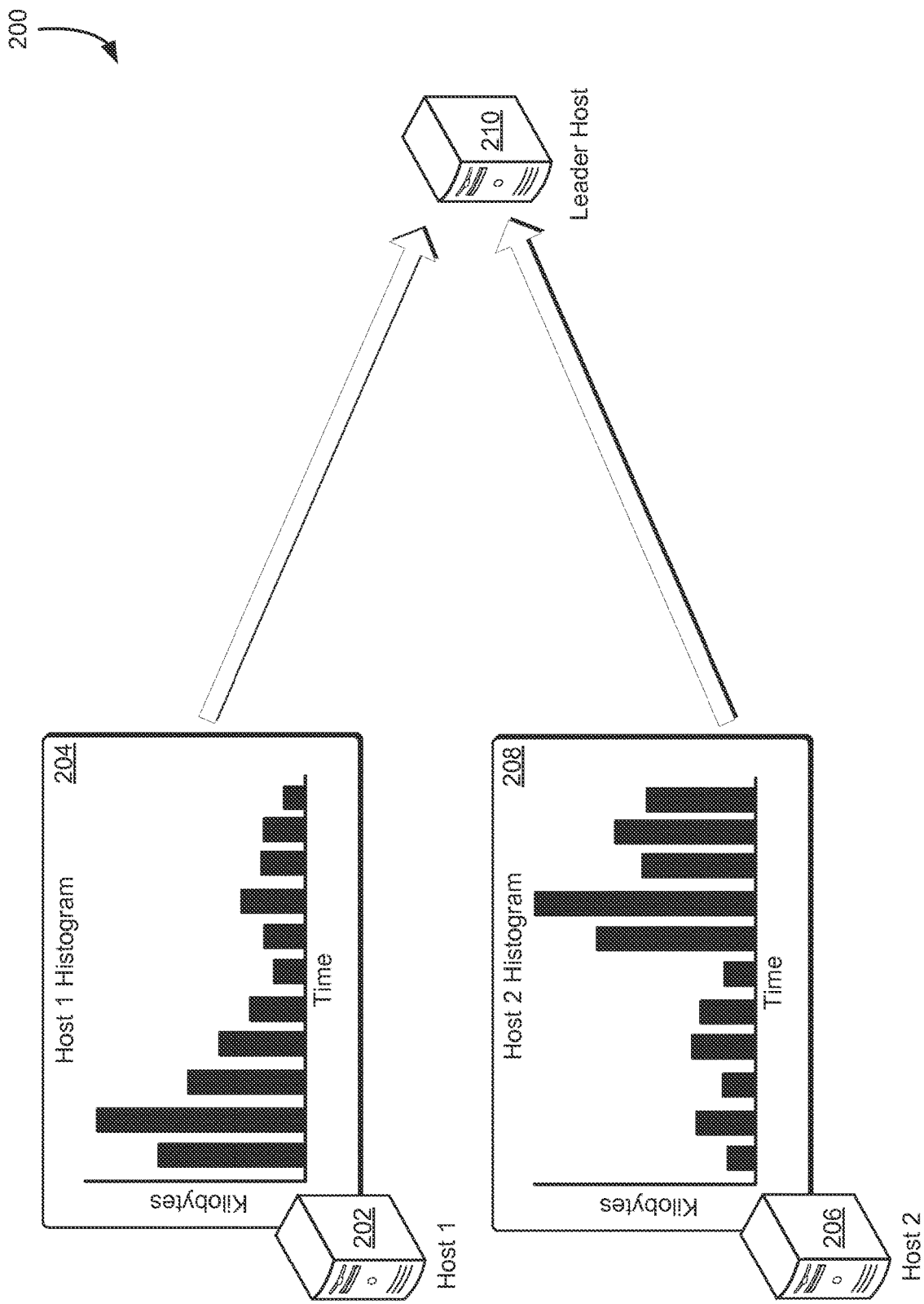
FIG. 2 shows an illustrative example of an environment in which one or more physical hosts generate data histograms for a time interval and transmits the data histograms to a leader physical host in accordance with at least one embodiment.

As noted above, each physical host of the horizontally scaled data ingestion fleet may be configured to generate a data histogram for each time interval (e.g., time interval as defined by a network administrator, a service provider, or other entity with authority to configure the physical hosts). The data histogram may be utilized to specify the amount of data obtained by the physical host throughout the duration of the time interval. Accordingly, FIG. 2 shows an illustrative example of an environment 200 in which one or more physical hosts 202, 206 generate data histograms 204, 208 for a time interval and transmits the data histograms 204, 208 to a leader physical host 210 in accordance with at least one embodiment.

In the environment 200, each physical host 202, 206 of a horizontally scaled data ingestion fleet may receive data from a variety of data sources, such as customers of a service provider, other services of the service provider, other physical hosts, and the like. Each data element received by a physical host 202, 206 may include a timestamp which may be used to denote when the data was received by the physical host 202, 206. Alternatively, as the data is received, the physical host 202, 206 may record an entry within a data log to denote when a particular data element was received. Thus, the physical host 202, 206 may generate a timestamp for each data element as it is received by the physical host 202, 206.

In an embodiment, as the physical host 202, 206 receives data from myriad data sources, the physical host 202, 206 will update a data histogram 204, 208 for a particular time interval to denote receipt of this data. The data histogram 204, 208 may specify the amount of data received by the physical host 202, 206 during the time interval. For instance, for each time sub-interval of the time interval, the physical host 202, 206 may identify the amount of data received by the physical host 202, 206 over this time interval that may be stored within the physical host 202, 206. Thus, the physical host 202, 206 may evaluate the timestamps of the received data and determine the amount of data obtained over the time interval. The results of this determination may then be used to populate the data histogram 204, 208.

Each physical host 202, 206 may be configured to generate a data histogram 204, 208 for a particular time interval. Thus, when a physical host 202, 206 has populated the data histogram 204, 208 based at least in part on the data received over the duration of the time interval, the physical host 202, 206 may transmit the data histogram 204, 208 to a leader physical host 210 within the distributed network. As described above, the leader physical host 210 may be selected from among the physical hosts 202, 206 of the horizontally scaled data ingestion fleet of physical hosts. For instance, the leader physical host 210 may be selected based at least in part on the remaining data storage capacity for the leader physical host 210 after ingestion of the data for the time interval. Alternatively, the leader physical host 210 may be selected based at least in part on the computational capabilities of the physical host in comparison to the other physical hosts 202, 206 of the fleet. In an alternative embodiment, the leader physical host 210 is an independent physical host not associated with the horizontally scaled data ingestion fleet of physical hosts 202, 206. This leader physical host 210 may be selected from a pool of available physical hosts that may be used for compilation of the data histograms 204, 208 from the physical hosts 202, 206 of the fleet.

As illustrated in FIG. 2, the information specified within the data histograms 204, 208 may differ throughout the time interval. For instance, as data is obtained by a physical host 202 during a time interval, other physical hosts 206 may receive less data during that time interval.

This may occur due to the configuration of the horizontally scaled data ingestion fleet, as the fleet may be configured to populate a particular physical host 202 first before provisioning an additional physical host 206 to support ingestion of data for additional time intervals. Further, as data is ingested and removed from a physical host 202, the histogram 204 for the physical host 202 may specify period of activity whereby data is ingested and other periods of limited activity where data is removed and replaced during these periods. Thus, the data histograms 204, 208 may differ for different physical hosts 202, 206 of the horizontally scaled data ingestion fleet over the time interval, as physical hosts 202, 206 are provisioned in response to increased data loading, de-provisioned in response to decreased data loading, and replacement of data within the physical hosts 202, 206.

Figure 3:
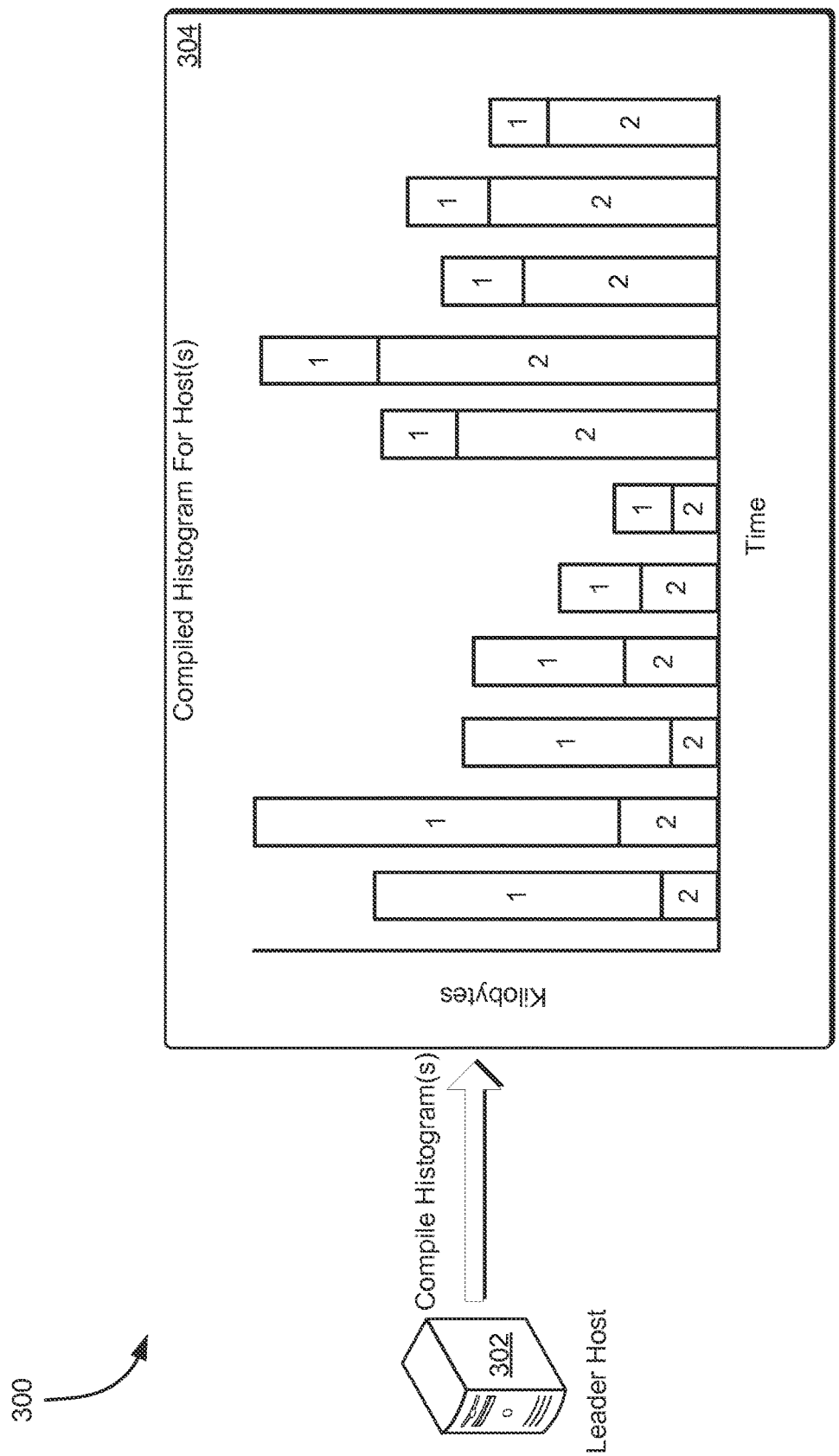
FIG. 3 shows an illustrative example of an environment in which a leader physical host obtains one or more data histograms from one or more physical hosts and compiles the one or more data histograms in accordance with at least one embodiment.

As noted above, a leader physical host, upon obtaining the various data histograms from the physical hosts of the horizontally scaled data ingestion fleet, may merge these various data histograms to generate a compiled data histogram for the various physical hosts over a particular time interval. Accordingly, FIG. 3 shows an illustrative example of an environment 300 in which a leader physical host 302 obtains one or more data histograms from one or more physical hosts and compiles the one or more data histograms in accordance with at least one embodiment. In the environment 300, the leader physical host 302 may utilize the obtained one or more data histograms from the physical hosts of the horizontally scaled data ingestion fleet to generate a compiled data histogram 304 that corresponds to a time interval of data ingested by the physical hosts during the time interval.

When the leader physical host 302 generates the compiled data histogram 304 for the plurality of physical hosts of the horizontally scaled data ingestion fleet, the leader physical host 302 may keep track of the contribution by each physical host to the data obtained during the time sub-intervals of the time interval. For instance, as illustrated in FIG. 3, the leader physical host 302 has denoted, for each time sub-interval of the time interval, the data contribution of each physical host to the particular data entry within the compiled data histogram 304. It should be noted that while the data histogram 304 illustrated in FIG. 3 denotes the contribution of each physical host to the data entry within the compiled data histogram 304, the leader physical host 302 may keep track of the contribution made by each physical host through use of a database or other data store, which may specify the amount of data stored within each physical host for each data interval specified in the compiled data histogram 304. Thus, in some instances, the compiled data histogram 304 may differ from the one illustrated in FIG. 3, as the data histogram 304 need not indicate directly the contribution made by each physical host of the fleet.

In an embodiment, the leader physical host 302 divides the compiled data histogram 304 into a number of segments equal to the number of physical hosts that have contributed data histograms to the leader physical host 302. Each segment may correspond to different time sub-intervals of the overall time interval for the compiled data histogram 304. Further, the segments may be generated such that all the segments correspond to an equal or approximately equal amount of data. For example, if the compiled data histogram 304 corresponds to data ingested by two distinct physical hosts for the time interval, the leader physical host 302 may divide the compiled data histogram 304 into two segments. Further, the leader physical host 302 may determine the total amount of data ingested by the physical hosts during the time interval and divide this total amount by the number of physical hosts that have ingested the data during the time interval. Using this data amount, the leader physical host 302 may identify a first time interval that covers this data amount. Next, the leader physical host 302 may identify a second time interval that covers this data amount, starting from the end of the previous time interval. This may continue until the time interval segments have been identified for the number of physical hosts.

Once the leader physical host 302 has divided the compiled data histogram into a number of segments equal to the number of physical hosts that have provided their respective data histograms to the leader physical host 302, the leader physical host 302 may assign each segment to a physical host based at least in part on the contributions made by each physical host during the time interval defined by the segment. For instance, the leader physical host 302 may assign a particular segment to the physical host that has contributed the most data (e.g., has stored the most data) for the time interval defined by the segment. In the event that the same physical host has contributed the most data for multiple histogram segments, the leader physical host 302 may assign a segment to the physical host that corresponds to the greatest amount of data stored within the physical host during the time interval defined by the segment. The other segments may then be assigned to other physical hosts that may have contributed a substantial amount of data for the time intervals of these segments.

Figure 4:
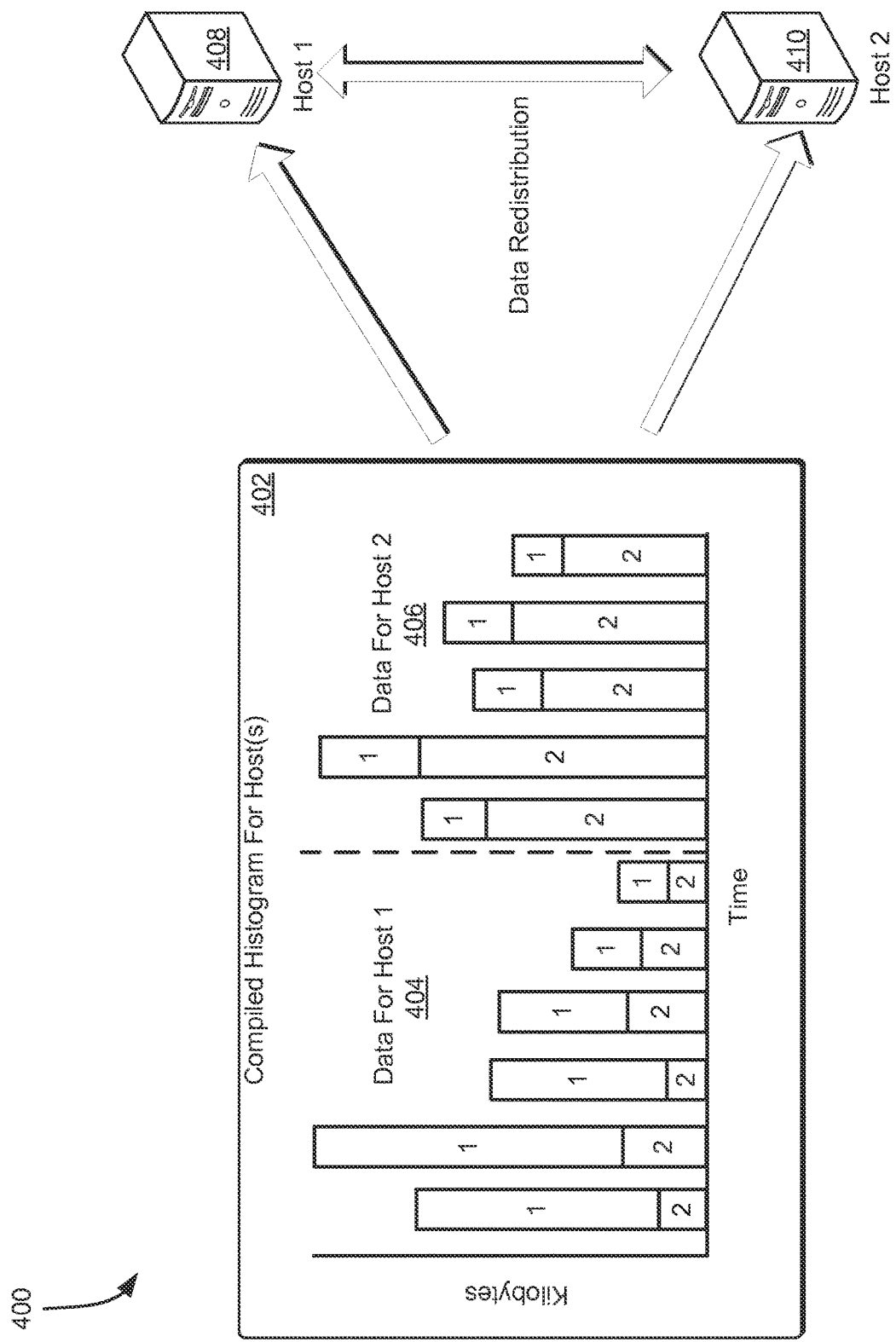
FIG. 4 shows an illustrative example of an environment in which a compiled data histogram is divided into segments weighted by size of the observation payloads for assignment and distribution to a number of physical hosts in accordance with at least one embodiment.

As noted above, a leader physical host may transmit the various segment assignments to the physical hosts to enable an exchange of data among these physical hosts based at least in part on these segment assignments. Accordingly, FIG. 4 shows an illustrative example of an environment 400 in which a compiled data histogram 402 is divided into segments 404, 406 weighted by size of the observation payloads for assignment and distribution to a number of physical hosts 408, 410 in accordance with at least one embodiment. In the environment 400, the leader physical host may determine that the horizontally scaled data ingestion fleet includes at least two physical hosts 408, 410 that have contributed data histograms for a time interval to the leader physical host for analysis. The leader physical host may divide the compiled data histogram 402 into a number of segments equal to the number of physical hosts 408, 410 that have provided data histograms to the leader physical host and have stored data for the time interval that is covered by the compiled data histogram 402. Further, the leader physical host may generate the segments such that each segment corresponds to an approximately (e.g., subject to a particular data granularity) equal amount of data that may be stored among the physical hosts 408, 410 of the horizontally scaled data ingestion fleet. For instance, while the leader physical host may divide the compiled data histogram 402 into a number of segments, each segment may correspond to time intervals of differing length so long as the amount of data is close to uniform across the various segments.

As illustrated in FIG. 4, the physical leader host has divided the compiled data histogram 402 for the physical hosts 408, 410 into two distinct segments as a result of determining that the fleet comprises two distinct physical hosts 408, 410 (e.g., Host 1 and Host 2). The amount of data assigned to each segment may be identical or within a particular margin based at least in part on the granularity of the data observations for the time interval as represented in the compiled data histogram 402. For instance, a data histogram with greater granularity may enable assignment of segments that more closely represent an equal distribution of data among the physical hosts 408, 410. Alternatively, a data histogram with lesser granularity may, by definition, be coarser, thereby reducing the ability to generate segments that closely represent an equal distribution of data in a manner that is similar to a data histogram that has finer granularity. Once the leader physical host has divided the compiled data histogram 402 into a number of segments, the leader physical host may assign each segment to a single physical host 408, 410. The assignment of the segment to a particular physical host 408, 410 may be performed based at least in part on the volume of data from the segment that may be stored within each physical host 408, 410. For instance, if a greater concentration of data within a segment is stored within a particular physical host than in any other physical host, the leader physical host may assign this segment to the particular physical host. As an illustrative example, the first segment 404 of the compiled data histogram 402 may be assigned to the first physical host 408 (e.g., Host 1) since the first physical host 408 has stored a greater concentration of data of the segment than any other physical host 410. Similarly, the second segment 406 may be assigned to the second physical host 410 (e.g., Host 2) since the second physical host 410 has stored a greater concentration of data of the segment.

Once the leader physical host has assigned each data segment 404, 406 to distinct physical hosts 408, 410 of the horizontally scaled data ingestion fleet, the leader physical host may transmit these assignments to the corresponding physical hosts 408, 410. In an embodiment, the physical hosts 408, 410 of the horizontally scaled data ingestion fleet may connect to each other to initiate data redistribution among the physical hosts 408, 410 and based at least in part on the received assignments. For instance, a physical host 408, 410 may receive executable instructions or requests from the other physical hosts in the fleet to transmit data that may have been assigned to each of these other physical hosts by virtue of the assignments issued to each of these other physical hosts. For instance, using the illustrative example in FIG. 4, the first physical host 408 may transmit a request to the second physical host 410 to provide data corresponding to the first time segment 404 of the compiled data histogram 402. This request may cause the second physical host 410 to identify any data with timestamps corresponding to the time interval of this first time segment 404 and provide this data to the first physical host 408. Similarly, the second physical host 410 may transmit a request to the first physical host 408 to provide its data that corresponds to the second time segment 406 of the compiled data histogram 402. Thus, the second physical host 410 may obtain this data from the first physical host 408.

The resulting number of exchanges may thus be expected to have asymptotic behavior of:

$$O\left(\left(1 - \frac{1}{N}\right)M\right)$$

where N is the number of physical hosts 408, 410 of the horizontally scaled data ingestion fleet and M is the total amount (measured in bytes) of data ingested by the fleet during the time interval that is to be sorted. Similarly, each physical host 408, 410 of the horizontally scaled data ingestion fleet may be expected to have asymptotic behavior of:

$$O\left(\left(1 - \frac{1}{N}\right)\frac{M}{N}\right)$$

where N is the number of physical hosts 408, 410 of the horizontally scaled data ingestion fleet and M is the total amount of data to be sorted. Each physical host 408, 410, upon obtaining the data corresponding to its time segment as assigned by the leader physical host, may sort the obtained data along with any data that was not exchanged with other physical hosts within the fleet. This sorting of data may ensure that the data has at least some global ordering due to the prior partitioning of the time ranges by the leader physical host. The sorting of data for each physical host 408, 410 may be expected to have asymptotic behavior of:

$$O\left(\left(\frac{M}{N}\right)\log\left(\frac{M}{N}\right)\right)$$

resulting in a globally sorted dataset that may be partitioned across a number of horizontally scaled physical hosts 408, 410.

Figure 5:
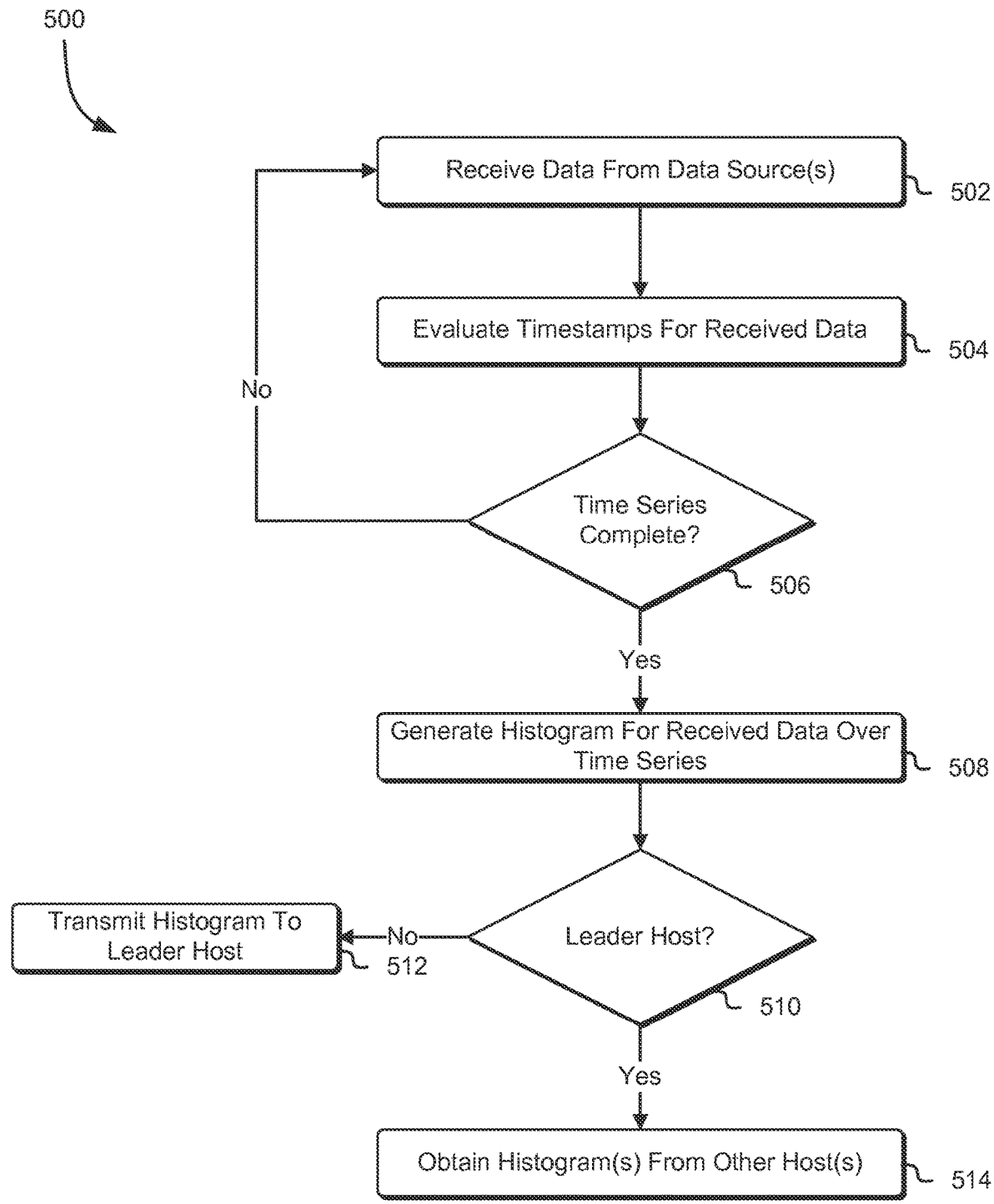
FIG. 5 shows an illustrative example of a process for generating a data histogram for data received over a duration of a time interval and providing the data histogram to a leader physical host in accordance with at least one embodiment.

As noted above, individual physical hosts of a horizontally scaled data ingestion fleet of physical hosts may receive data from various data sources and generate a data histogram that specifies the amount of data received during a particular time sub-interval or time interval. For instance, each data element received may be noted within a log that may specify the size of the data element and a corresponding timestamp of when the data element was received. This log may be utilized to generate the data histogram. Alternatively, as the data is received, the physical host may update the data histogram to represent the latest addition of this data. Once the data histogram has been completed, the physical host may transmit this data histogram for the time interval to the leader physical host for compilation. Accordingly, FIG. 5 shows an illustrative example of a process 500 for generating a data histogram for data received during a time interval and providing the data histogram to a leader physical host in accordance with at least one embodiment. The process 500 may be performed by any physical host of a horizontally scaled data ingestion fleet, which may receive data from various data sources and store this data for later use.

A physical host of a horizontally scaled data ingestion fleet may receive 502 data from a variety of different data sources as the data is ingested by the fleet. For instance, a customer may upload data at any time to the horizontally scaled data ingestion fleet in order to maintain redundant data storage for its data. Alternatively, one or more services of a service provider may utilize the horizontally scaled data ingestion fleet to store customer information or data necessary to support these services. The received data may include timestamps denoting when the data was received by the physical host. For instance, the physical host, upon receiving data from one or more data sources, may record information concerning the received data within a log. This log may specify identifiers for the data elements, the size of the data elements (e.g., kilobytes, megabytes, gigabytes, etc.), and a timestamp denoting when the data elements were received. These timestamps may be generated by the physical host. Alternatively, the data elements may be provided to the physical host with associated timestamps generated by a computer system of the entity providing the ingested data elements.

In an embodiment, the physical host is configured to separate data according to a predetermined time interval as defined by an administrator of the horizontally scaled data ingestion fleet or other entity. For instance, the physical host may be configured to separate data received into segments based at least in part on the predetermined time interval for each segment. Thus, each segment may correspond to a particular time interval (e.g., an hour, a day, a week, etc.). The physical host may evaluate 504 the timestamps for the received data in order to determine 506 whether a time interval has been completed for data collection. If the time interval for the time interval has not elapsed, the physical host may continue to receive 502 data from various data sources during the time interval until the time interval has elapsed (e.g., completed). While the physical host may continue to receive data, this newly received data may not be included as part of this particular time interval and may be placed in a different segment (e.g., logical data container, etc.) of the physical host.

If the time interval has been completed, the physical host may utilize the information in the log or otherwise evaluate the obtained data to generate 508 a data histogram to illustrate the volume of data obtained throughout the duration of the time interval. The data histogram may be utilized to demonstrate the size of data elements received for particular time sub-intervals of the time interval. For instance, if the data histogram is generated with fine granularity, the data histogram may illustrate how much data has been obtained for smaller time intervals. As noted above, the data histogram may not specify a constant stream of data being obtained by the physical host, as the physical host may ingest data until it reaches capacity, at which point the physical may remove older or obsolete data and replace with data with newly ingested data. Thus, the data histogram for a physical host may illustrate time periods of great data ingestion and other time period of limited to no data ingestion. It should be noted that the physical host may, in some instances, generate 508 the data histogram prior to determining whether the time interval has been completed or not. For instance, as the physical host receives data from various data sources, the physical host may update the data histogram to specify information related to the newly received data. Thus, the physical host may continually modify the data histogram until the time interval has been completed.

Once the physical host has generated the data histogram for the time interval, the physical host may determine whether it is the leader physical host for compilation of the data histograms generated by the physical hosts of the horizontally scaled data ingestion fleet. Each physical host of the fleet may be configured to collectively determine which physical host may be designated as the leader physical host for the fleet. For instance, the physical hosts of the fleet may select a physical host from within the fleet that has sufficient capacity to support the various data histograms from the other physical hosts in the fleet and also has the computational capability to process the data histograms for compilation, division into segments, and assignment of the segments to the physical hosts of the fleet. In some embodiments, the physical hosts of the horizontally scaled data ingestion fleet will select a leader physical host from a pool of physical hosts that are not part of the fleet but have the computational capability to process the various data histograms from the physical hosts of the fleet. Thus, the physical host may determine 510 whether it has been designated as the leader physical host for the plurality of physical hosts of the horizontally scaled data ingestion fleet.

If the physical host is not the designated leader physical host for the horizontally scaled data ingestion fleet, the physical host may transmit 512 the generated data histogram to the designated leader physical host for processing. Alternatively, if the physical host has been designated at the leader physical host for the fleet, the physical host may obtain 514, from other physical hosts of the fleet, the data histograms for these other physical hosts. The physical host may process these obtained data histograms, along with its own data histogram, by compiling these data histograms into a compiled data histogram that illustrates the data ingested by the physical hosts over the duration of the time interval. The physical host may keep track of the data contribution to the compiled data histogram by each physical host in order to enable assignment of segments of the data histogram for data redistribution among the physical hosts of the horizontally scaled data ingestion fleet.

Figure 6:
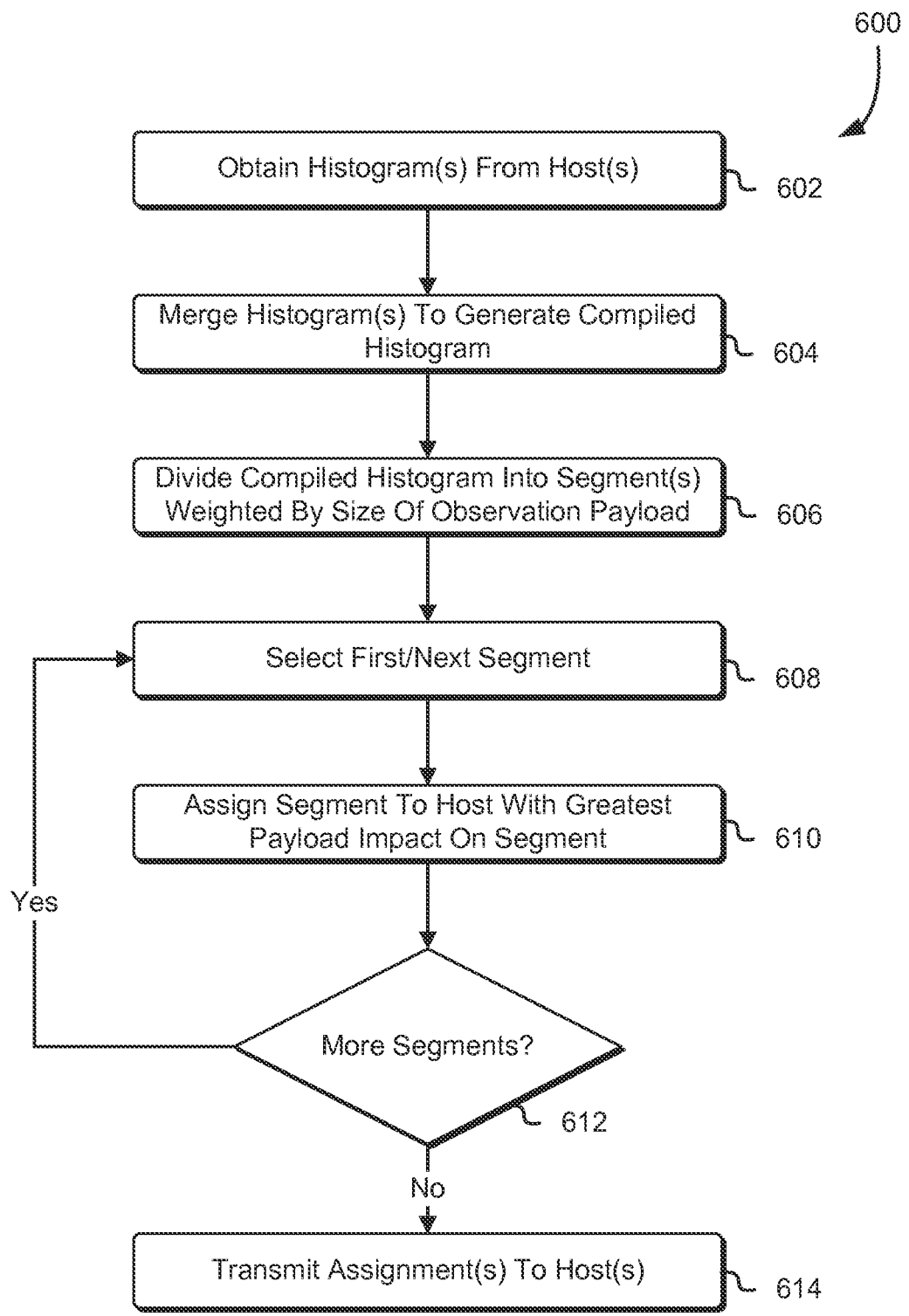
FIG. 6 shows an illustrative example of a process for generating a compiled data histogram based at least in part on data histograms from one or more physical hosts and dividing the compiled data histogram into segments for assignment to the one or more physical hosts in accordance with at least one embodiment.

As noted above, a leader physical host may obtain one or more data histograms from each physical host of a plurality of physical hosts of a horizontally scaled data ingestion fleet. The leader physical host may compile these one or more data histograms while keeping track of the contribution of each physical host to the amount of data specified within the compiled data histogram for a time interval of the histogram. This information may be utilized to divide the compiled data histogram into a number of segments and to assign each of these segments to distinct physical hosts of the fleet for data redistribution among these physical hosts. Accordingly, FIG. 6 shows an illustrative example of a process 600 for generating a compiled data histogram based at least in part on data histograms from one or more physical hosts and dividing the compiled data histogram into segments for assignment to the one or more physical hosts in accordance with at least one embodiment. The process 600 may be performed by the aforementioned leader physical host, which may be selected from among the physical hosts of the horizontally scaled data ingestion fleet or from a pool of independent physical hosts that are not part of the fleet.

When a time period for a particular time interval has elapsed, each physical host of the horizontally scaled data ingestion fleet may generate their respective data histograms or other distributions of data sets for data points received during the time interval based at least in part on the data ingested by each of these physical hosts. These physical hosts may identify the leader physical host based at least in part on prior selection of the leader physical host by the physical hosts of the fleet. These physical hosts may transmit their respective data histograms or other distributions to the leader physical host for compilation and processing. In an embodiment, after the particular time interval has elapsed, the leader host will query the various physical hosts of the fleet. This may cause the various physical hosts to each transmit their respective data histograms to the leader host in response to the query. Thus, once a time period for a particular time interval has elapsed, the leader physical host may obtain 602, from the physical hosts of the horizontally scaled data ingestion engine, the data histograms for these physical hosts. It should be noted that while time intervals are utilized extensively for the purpose of illustration, other domains may be utilized to represent the data sets obtained by the physical hosts of the fleet. Further, the leader physical host may obtain 602 the data histogram from a physical host by obtaining the data histogram itself, obtaining parameters for a function (e.g., polynomial) that approximates the histogram, or by receiving data that can be used to generate the histogram (e.g., the data itself or data points that are derived from the data). In some embodiments, the leader physical host will receive portions of the data histograms from the other physical hosts as the data histograms are generated over the particular time interval. Thus, the leader physical host may continue to update the compiled histogram, as described below, as updates to the data histograms are made.

Once the leader physical host has obtained the data histograms from each of the physical hosts of the horizontally scaled data ingestion fleet, the leader physical host may merge 604 the obtained data histograms to generate a compiled data histogram that specified the total amount of data received over the duration of the time interval. In compiling the obtained data histograms from the physical hosts, the leader physical host may keep track of the contribution of each physical host such that for each time interval the leader physical host may determine which physical host has stored the greatest amount of data. The compiled data histogram may directly specify the contribution of each physical host to the total amount of data for each time interval, such as illustrated in FIG. 3. Alternatively, the leader physical host may maintain a database that may be used to specify, for each time interval of the time interval, the contribution of each physical host. Thus, in such instances, the histogram may only specify the total amount of data obtained over the duration of the time interval.

The leader physical host, upon generating the compiled data histogram, may divide 606 the compiled data histogram into a number of segments that may be weighted by the size of the observation payload. For instance, each segment may correspond to a similar amount of data but may differ in the assigned time interval for this data. The leader physical host may divide the compiled data histogram based at least in part on the number of physical hosts of the horizontally scaled data ingestion fleet. For example, if the fleet comprises five distinct physical hosts, the leader physical host may divide the compiled data histogram into five distinct segments, each comprising a similar amount of data but potentially differing in the time range for each segment as the ingestion of data during the time interval may not be uniform.

Once the leader physical host has divided the compiled data histogram into a number of segments, the leader physical host may select 608 a first data segment and assign 610 this segment to a physical host that may have the greatest payload impact on the selected segment. The leader physical host may select the first segment by starting with the first segment of the time interval (e.g., minimum time entry for the time interval). The leader physical host may evaluate the contribution of each physical host to the ingestion of data during the time interval of the segment and determine which physical host has highest relative contribution to the data ingested and stored during the time interval when compared to other physical hosts that have ingested and stored data during the same time interval. Based at least in part on this determination, the leader physical host may assign this segment to the physical host that has provided the greatest contribution.

The leader physical host may determine 612 whether there are any additional segments of the compiled data histogram that need to be assigned to other physical hosts of the fleet. If so, the leader physical host may select 608 another segment and assign 610 this segment to the physical host that has contributed the greatest payload impact on the selected segment. The leader physical host may continue assigning segments to different physical hosts until all segments have been assigned. In an embodiment, the leader physical host will evaluate each segment in a synchronous manner, such that the leader physical host may determine whether a physical host has provided the greatest data impact for more than one segment. If this occurs, the leader physical host may assign a segment to the physical host wherein the physical host has stored the greatest amount of data. Any remaining segments for which the physical host has also provided the greatest impact may be assigned to other physical hosts that may have had a significant impact (e.g., second greatest impact) but not to the level of the physical host.

Once the leader physical host has assigned a segment to each physical host of the horizontally scaled data ingestion fleet, the leader physical host may transmit 614 the one or more assignments to each of the physical hosts. This may cause the physical hosts of the fleet to connect to one another and exchange data such that each physical host will have stored within only the data that has been assigned to it by the leader physical host. This may result in the data within each physical host having a level of global ordering due to the partitioning of the compiled data histogram into distinct time intervals and assignment of these segments to the individual physical hosts of the fleet.

Figure 7:
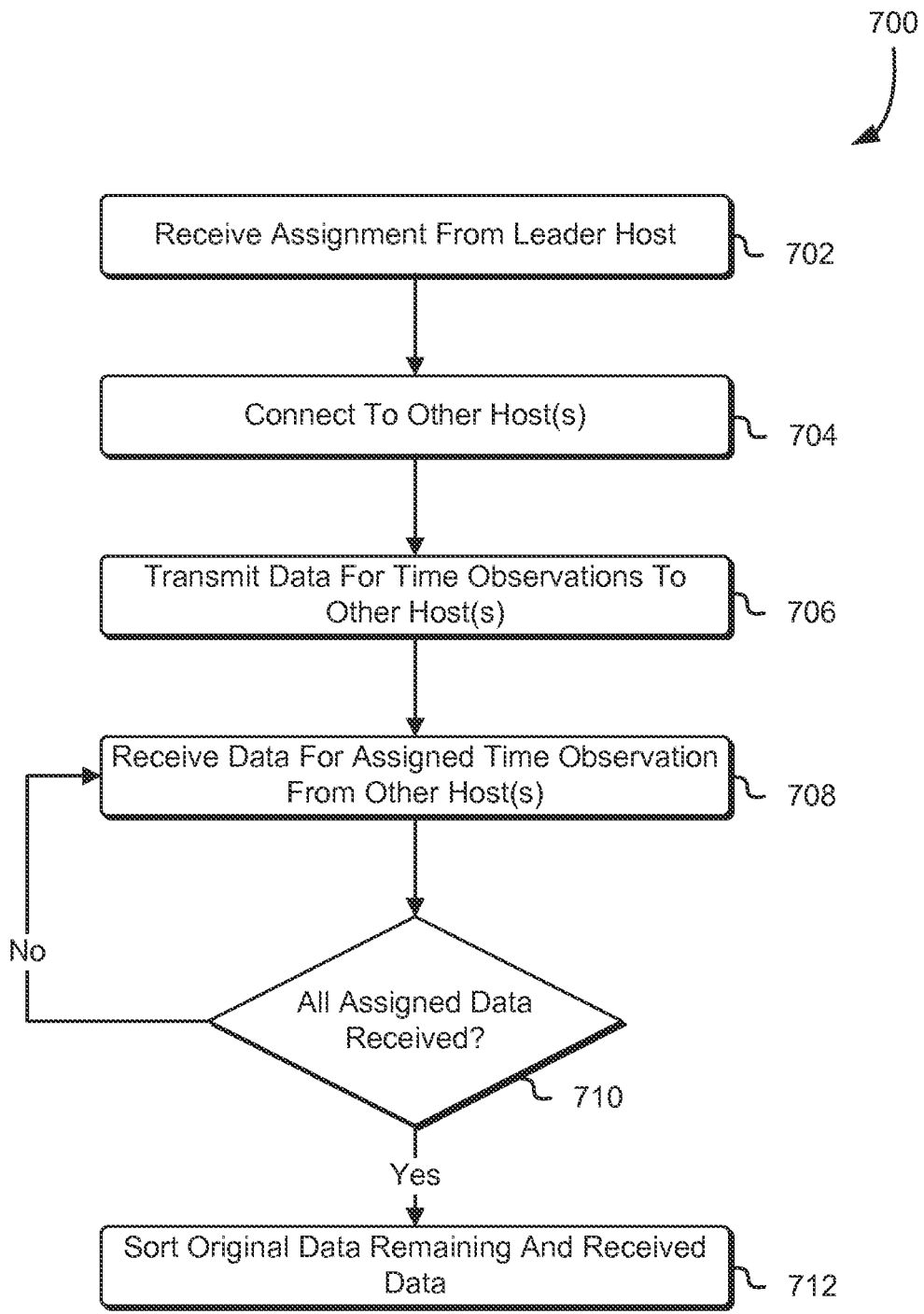
FIG. 7 shows an illustrative example of a process for connecting to other physical hosts to transmit and receive data according to an assignment from the leader physical host in accordance with at least one embodiment.

As noted above, the leader physical host may divide a compiled data histogram detailing data ingestion for a time interval into one or more segments. Each segment may be assigned to a physical host based at least in part on the contribution to the segment by each of the physical hosts of the fleet. The leader physical host may provide these assignments to the physical hosts of the fleet, which may cause the physical hosts to exchange data amongst themselves until each physical host has within it data corresponding to the time interval assigned to it by the leader physical host. Accordingly, FIG. 7 shows an illustrative example of a process 700 for connecting to other physical hosts to transmit and receive data according to an assignment from the leader physical host in accordance with at least one embodiment. The process 700 may be performed by each physical host of the horizontally scaled data ingestion fleet, whereby the physical host may be configured to communicate with other physical hosts within the fleet and organize data stored within the physical host once the exchange of data has been completed.

When the leader physical host has divided the compiled data histogram into distinct segments and has assigned these segments to the physical hosts of the horizontally scaled data ingestion fleet, the leader physical host may transmit these assignments to the corresponding physical hosts of the fleet. Thus, a physical host may receive 702, from the leader physical host, its assignment. The assignment may denote the assigned time sub-interval for which the physical host is to have stored corresponding data. As noted above, a physical host may obtain data from various data sources over a wide range of time, which may cover the entire time interval. However, the assignment may limit the time sub-interval for which this physical host is to have data. Thus, the physical host may need to transmit data to other physical hosts based at least in part on their assigned intervals and obtain data corresponding to its assigned time sub-interval from other physical hosts.

In order to transmit data to other physical hosts and obtain data from these other physical hosts, the physical host may connect 704 to these other physical hosts. The connection among these physical hosts may be generated through one or more communications channels, such as the Internet. Once the connections within the fleet have been established, each physical host of the fleet may transmit requests to the other physical hosts to obtain data corresponding to its assigned time sub-interval as determined by the leader physical host. A physical host may thus receive a number of requests from each of the physical hosts of the fleet to obtain data that may correspond to their assigned time sub-intervals. Thus, in response to these requests, the physical host may transmit 706 data for time observations corresponding to these time sub-intervals to the designated physical hosts.

In a similar manner, the physical host may transmit requests to the other physical hosts of the fleet to obtain data corresponding to its assigned time sub-interval. Thus, while the physical host is connected to the other physical hosts of the fleet, the physical host may receive 708 data corresponding to its assigned time sub-interval from these other physical hosts. As the physical host receives this data from the other physical hosts, the physical host may determine 710 whether it has received all of its assigned data. For instance, the physical host may determine whether each physical host of the fleet has provided the necessary data in response to the request. The physical host may be provided with information from the leader physical host detailing the amount of data stored within each of the other physical hosts of the fleet that may be assigned to the physical host. Thus, the physical host may have visibility as to the expected amount of data that is to be received from the other physical hosts of the fleet. If the physical host has not received all of its assigned data from the other physical hosts of the fleet, the physical host may continue to receive 708 from these other physical hosts. Additionally, the physical host may transmit additional requests to any physical host of the fleet that has not completed transmitting the assigned data to the physical host.

Once the physical host has obtained all of its assigned data and has transmitted any other data assigned to other physical hosts to the corresponding physical hosts, the physical host may sort 712 the received data and any other data assigned to the physical host that was originally stored within the physical host. The data may be sorted according to the timestamp for each data element, such that the data may be easily located in response to a request to obtain data for a particular time sub-interval. Since each physical host may perform a similar sorting process for their respective data, the horizontally scaled data ingestion fleet may ensure that the data stored therein has a level of global ordering. For instance, the data within each physical host may now correspond to a particular time sub-interval, which may be catalogued within a database to support customer queries and requests for data.

Figure 8:
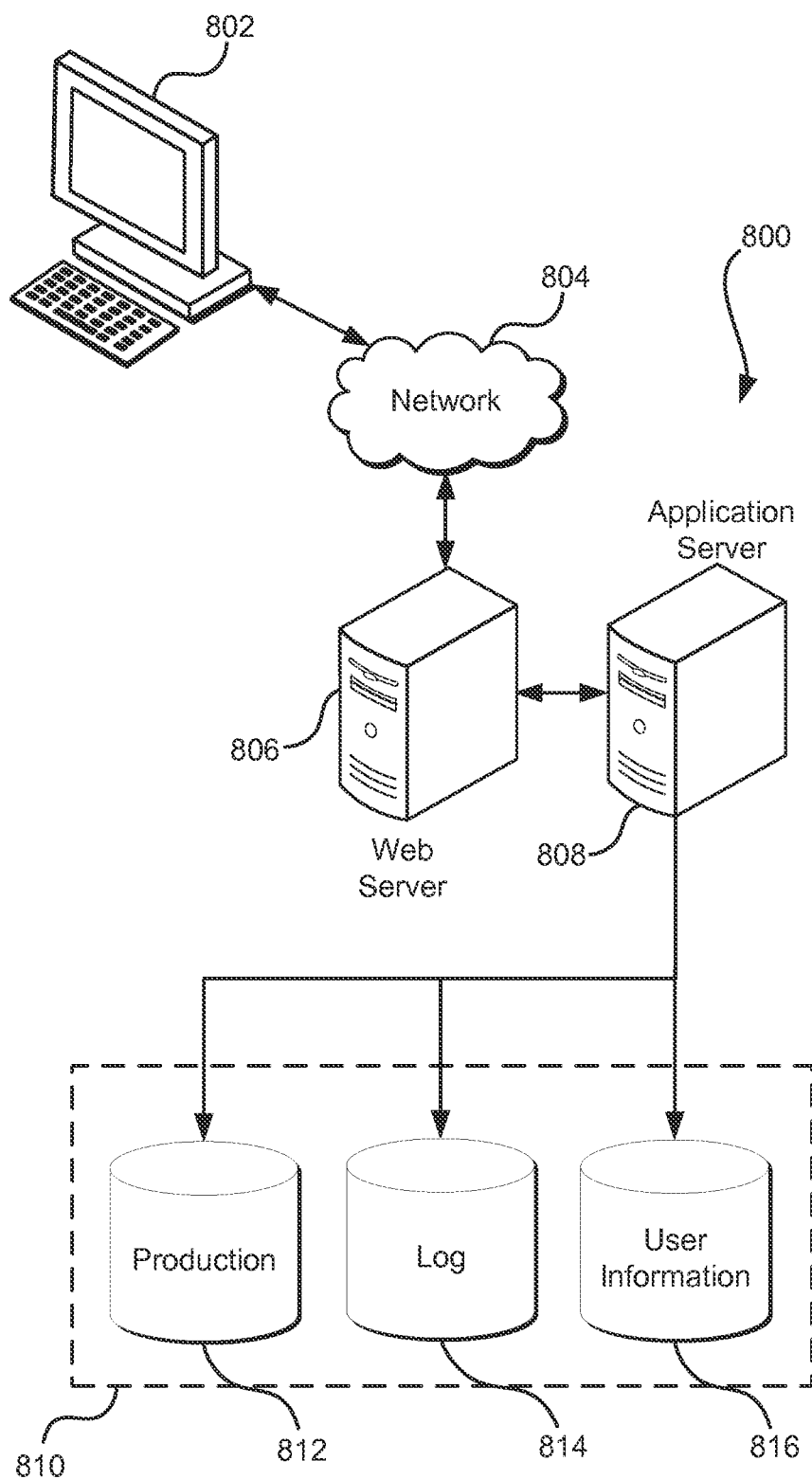
FIG. 8 shows an illustrative example of an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a leader host of a fleet of physical hosts that:
   receives, from a physical host of the fleet of physical hosts, a data histogram that indicates a distribution of time series data over time;
   compiles a plurality of received data histograms that include the received data histogram to generate a compiled data histogram that indicates a compiled distribution of time series data over a time interval;
   partitions the time interval to a plurality of time sub-intervals;
   distributes the plurality of time sub-intervals among physical hosts of the fleet of physical hosts such that a first time sub-interval is distributed to a first physical host that had a highest relative contribution to the first time sub-interval;
   distributes the plurality of time sub-intervals among physical hosts of the fleet of physical hosts such that the first time sub-interval is distributed to the first physical host, wherein the first physical host is selected based on having at least as high a contribution of time series data to the first time sub-interval as other physical hosts; and
   the first physical host further:
   receives, from the leader host, information identifying the first time sub-interval;
   communicates with other physical hosts of the fleet of physical hosts to obtain data for the first time sub-interval to generate an aggregated set of data for the first time sub-interval; and
   sorts the aggregated set of data.

2. The system of claim 1, wherein the leader host partitions the time interval into the plurality of time sub-intervals such that a number of the plurality of time sub-intervals is equal to a number of physical hosts of the fleet of physical hosts.

3. The system of claim 1, wherein the first physical host further:
   obtains the time series data from one or more computer systems over a duration of the time interval;
   records the time series data into the data histogram; and
   provides the data histogram to the leader host once the time interval has elapsed.

4. The system of claim 1, wherein the first physical host further:
   receives one or more requests from the other physical hosts to provide data for time intervals corresponding to the other physical hosts;
   identifies the data as identified data for the time intervals corresponding to the other physical hosts; and
   provides the identified data to the other physical hosts to fulfill the one or more requests.

5. A computer-implemented method, under control of one or more computer systems configured with executable instructions, comprising:
   obtaining individual distributions of data sets for respective individual computer systems of a fleet of computer systems, the individual distributions of data sets being over a domain and the data sets forming a distributed data set;
   compiling the individual distributions of data sets over the domain to generate a compiled distribution;
   partitioning the domain into a partitioned domain based at least in part on the compiled distribution;
   distributing individual domain partitions of the partitioned domain to individual computer systems of the fleet of computer systems, wherein the fleet of computer systems comprises a first individual computer system and wherein a first individual domain partition is distributed to the first individual computer system if a contribution of data by the first individual computer system to the first individual domain partition is at least as great a contribution to the first individual domain partition as a contribution from another individual computer system of the fleet of computer systems; and
   processing, by the individual computer systems, their respective individual partitions so as to sort a portion of the distributed data set.

6. The computer-implemented method of claim 5, wherein the domain is a duration of a time interval during which the data sets are ingested by the respective individual computer systems of the fleet of computer systems.

7. The computer-implemented method of claim 5, wherein the data sets comprise time series data over the domain.

8. The computer-implemented method of claim 5, further comprising distributing each of the individual domain partitions to each of the individual computer systems of the fleet of computer systems based at least in part on each individual computer system having at least as high a contribution for its assigned domain partition.

9. The computer-implemented method of claim 5, wherein distributing the individual domain partitions to the individual computer systems further causes the individual computer systems to communicate with other computer systems of the fleet of computer systems to obtain sub-portions of the portion of the distributed data set.

10. The computer-implemented method of claim 5, wherein the individual computer systems of the fleet of computer systems generate the individual distributions of data sets by recording time series data from one or more computer systems over the domain into the individual distributions of data sets.

11. The computer-implemented method of claim 5, wherein distributing the individual domain partitions of the partitioned domain to the individual computer systems of the fleet of computer systems further causes the individual computer systems of the fleet of computer systems to transmit data corresponding to other individual domain partitions to other individual computer systems of the fleet of computer systems.

12. The computer-implemented method of claim 5, wherein partitioning the domain into the partitioned domain further includes generating the individual domain partitions based at least in part on a number of individual computer systems of the fleet of computer systems.

13. A non-transitory computer-readable storage medium having stored thereon executable instructions that, when executed by one or more processors of a computer system, cause the computer system to at least:
- obtain data points;
- generate information indicating a distribution of the data points over a domain;
- provide the information to another computer system;
- receive, from the other computer system, information indicating a sub-domain of the domain;
- obtain, from other computer systems of a fleet of computer systems, additional data for the sub-domain of the domain;
- combine the additional data with locally stored data for the sub-domain to form a combined data set corresponding to the sub-domain, wherein the locally stored data comprises at least as much data as data from another computer system; and
- perform an operation on the combined data set so as to sort the combined data set.

14. The non-transitory computer-readable storage medium of claim 13, wherein the operation on the combined data set includes sorting the combined data set based at least on timestamps for the combined data set.

15. The non-transitory computer-readable storage medium of claim 13, wherein the domain is a duration of a time interval for which the data points are ingested by one or more computer systems of the fleet of computer systems.

16. The non-transitory computer-readable storage medium of claim 13, wherein the executable instructions further cause the computer system to provide locally stored data for another sub-domain of the domain to at least one other computer system of the fleet of computer systems.

17. The non-transitory computer-readable storage medium of claim 13, wherein the data points are obtained from one or more computer systems of a service provider over a duration of a time interval.

18. The non-transitory computer-readable storage medium of claim 13, wherein the other computer system is a leader physical host that utilizes the information and other information from the other computer systems of the fleet of computer systems to provide the information indicating the sub-domain of the domain.

19. The non-transitory computer-readable storage medium of claim 13, wherein the operation includes making the combined data set available in response to queries for data corresponding to the sub-domain.

20. The non-transitory computer-readable storage medium of claim 13, wherein the information indicating the sub-domain of the domain specifies data points ingested by computer systems of the fleet of computer systems during a time sub-interval of a time interval.

* * * * *